(12) United States Patent
Zielinski et al.

(10) Patent No.: US 10,561,968 B2
(45) Date of Patent: Feb. 18, 2020

(54) WATER SEPARATION FILTER

(71) Applicant: ILLINOIS TOOL WORKS INC., Glenview, IL (US)

(72) Inventors: James S. Zielinski, Wonder Lake, IL (US); Thomas F. Walker, Algonquin, IL (US); Mark R. Breining, West Chester, OH (US); Christopher J. Cichelli, Grays Lake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 844 days.

(21) Appl. No.: 14/772,841

(22) PCT Filed: Mar. 5, 2014

(86) PCT No.: PCT/US2014/020923
§ 371 (c)(1),
(2) Date: Sep. 4, 2015

(87) PCT Pub. No.: WO2014/164163
PCT Pub. Date: Oct. 9, 2014

(65) Prior Publication Data
US 2016/0023135 A1 Jan. 28, 2016

Related U.S. Application Data

(60) Provisional application No. 61/779,923, filed on Mar. 13, 2013.

(51) Int. Cl.
*B01D 27/08* (2006.01)
*B01D 27/14* (2006.01)
(Continued)

(52) U.S. Cl.
CPC ............. *B01D 29/03* (2013.01); *B01D 27/08* (2013.01); *B01D 27/146* (2013.01);
(Continued)

(58) Field of Classification Search
CPC .... B01D 29/03; B01D 29/016; B01D 29/031; B01D 29/21; B01D 35/30; B01D 36/003;
(Continued)

(56) References Cited

U.S. PATENT DOCUMENTS 3,622,007 A * 11/1971 Pappathatos ........... B01D 29/33
210/355
4,420,392 A * 12/1983 Harris ................ B01D 17/0208
210/114
(Continued)

FOREIGN PATENT DOCUMENTS

DE 102006005108 A1 8/2007
DE 102010062813 A1 6/2012
(Continued)

OTHER PUBLICATIONS

The Gas Tank Store, "Visu 1/4" 90 deg In-line fuel filter with bronze element", Just Gas Tanks. Jan. 5, 2011.*
ISR and WO for PCT/US2014/020923 dated Dec. 11, 2014.

*Primary Examiner* — Benjamin L Lebron
(74) *Attorney, Agent, or Firm* — Pilloff Passino & Cosenza LLP; Martin J. Cosenza

(57) ABSTRACT

A water separation filter is provided with a first compartment including a particulate filter and a second compartment including a hydrophobic filter for removing particle contaminants and water from a fuel flowing through the filter. Inlet and outlet fuel line couplings are provided so that the water separation filter can be installed as an in-line filter between a fuel tank and a combustion engine.

12 Claims, 3 Drawing Sheets

(51) Int. Cl.
  *B01D 29/03* (2006.01)
  *B01D 35/00* (2006.01)
  *B01D 35/30* (2006.01)
  *F02M 37/24* (2019.01)
  *F02M 37/32* (2019.01)

(52) U.S. Cl.
  CPC ......... *B01D 27/148* (2013.01); *B01D 35/005* (2013.01); *B01D 35/30* (2013.01); *F02M 37/24* (2019.01); *F02M 37/32* (2019.01); *B01D 29/031* (2013.01); *B01D 2201/02* (2013.01); *B01D 2201/29* (2013.01)

(58) Field of Classification Search
  CPC ............ B01D 2201/02; B01D 2325/38; B01D 29/117; B01D 29/58; B01D 29/23; B01D 29/232; B01D 29/606; B01D 29/055; B01D 29/56; B01D 29/605; B01D 29/33; B01D 29/72; B01D 35/157; B01D 35/147; B01D 35/14; B01D 35/153; B01D 35/26; B01D 35/02; B01D 35/306; B01D 35/1573; B01D 35/18; B01D 36/006; B01D 36/00; B01D 36/001; B01D 2201/291; B01D 2201/188; B01D 2201/50; B01D 2201/295; B01D 2201/302; B01D 2201/342; B01D 2201/347; B01D 2201/34; B01D 2201/4084; B01D 2201/0423; B01D 17/0208; B01D 17/10; B01D 17/0214; B01D 17/0217; B01D 17/045; B01D 33/06; B01D 33/0315; B01D 27/103; B01D 27/14; B01D 27/144; B01D 27/005; B01D 27/08; B01D 27/06; B01D 27/146; B01D 27/148; B01D 35/005; B01D 2201/29; F02M 37/221; F02M 37/24; F02M 37/22; F02M 37/16; F02M 37/44; F02M 37/46; F02M 37/20; F02M 1/16; F02M 31/20; F02M 37/32; F02B 3/06; F02B 61/045; F02B 75/22
  See application file for complete search history.

(56) References Cited

U.S. PATENT DOCUMENTS

| | | | | |
|---|---|---|---|---|
| 4,427,542 | A * | 1/1984 | Glover | B01D 36/003 210/121 |
| 5,017,285 | A * | 5/1991 | Janik | B01D 17/00 210/232 |
| 5,797,378 | A * | 8/1998 | Kato | F02B 61/045 123/198 E |
| 6,171,492 | B1 * | 1/2001 | Hedgepeth | B01D 27/005 210/243 |
| 2012/0043267 | A1 * | 2/2012 | Thienel | B01D 17/045 210/172.1 |
| 2013/0068677 | A1 | 3/2013 | Girondi | |
| 2013/0146524 | A1 * | 6/2013 | Veit | F02M 37/221 210/300 |
| 2013/0292324 | A1 * | 11/2013 | Girondi | B01D 29/055 210/450 |

FOREIGN PATENT DOCUMENTS

| | | | |
|---|---|---|---|
| WO | 2011101750 A1 | 8/2011 | |
| WO | 2012104699 A1 | 8/2012 | |
| WO | WO-2012104699 A1 * | 8/2012 | .......... B01D 29/055 |
| WO | 2013016199 A1 | 1/2013 | |

* cited by examiner

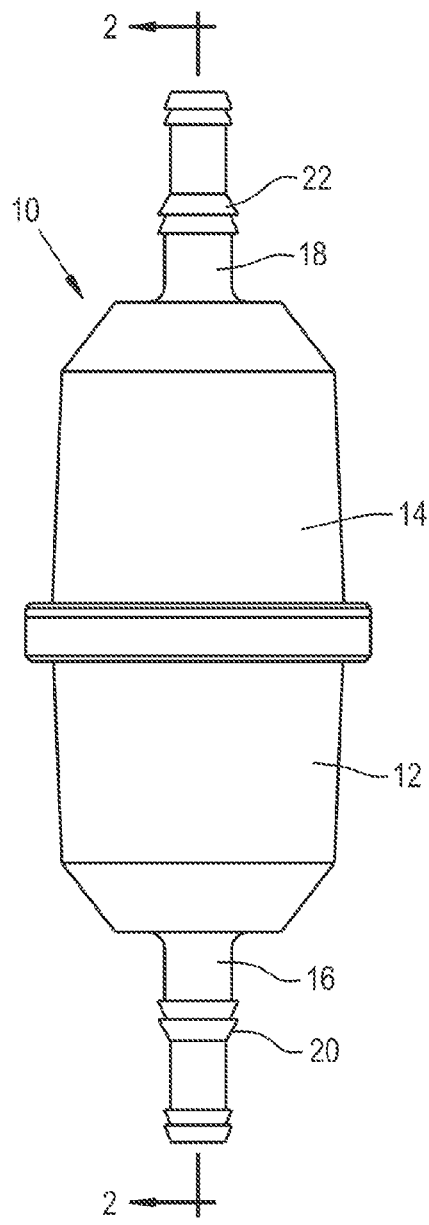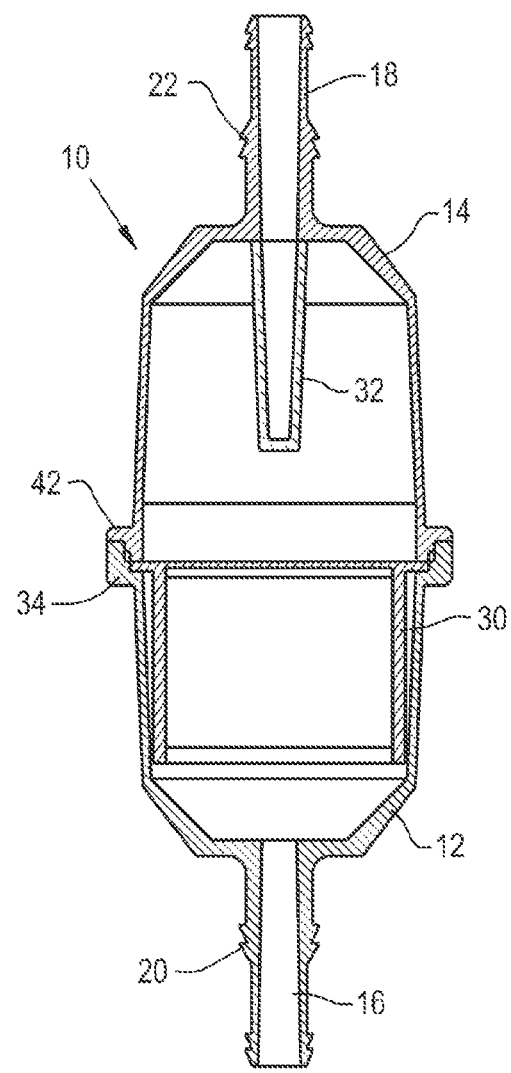
Fig. 1
Fig. 2

WATER SEPARATION FILTER

CROSS-REFERENCE TO RELATED APPLICATIONS

The present application is a National Phase of PCT/US2014/020923 filed Mar. 5, 2014 and claims the benefits of U.S. Provisional Application Ser. No. 61/779,923 filed Mar. 13, 2013.

FIELD OF THE INVENTION

The present invention relates generally to fluid filters, and, more specifically, to filters used for removing contaminants from fuels for internal combustion engines.

BACKGROUND OF THE INVENTION

It is known to provide filters for fluid systems to remove contaminants. One such device is shown in pending patent application PCT/US 12/047623.

Fuel contamination is a recurring problem associated with the use and operation of small internal combustion engines, such as those for lawnmowers, trimmers, edgers, vacuums and blowers, snow throwers, other gasoline engine powered yard and garden equipment, recreational equipment such as snowmobiles, boats and the like. Users of such equipment often store fuel for relatively long periods of time in fuel storage containers kept outdoors, in garages, and the like. The fuel storage containers are opened numerous times, and relatively small amounts of the fuel are transferred from the storage container to a relatively small fuel tank on the equipment.

Often, the fuel tank on the equipment is quite dirty, and may be covered with dirt, dust, grass clippings and other debris. Even when cleaned and opened carefully, debris from around the inlet opening or the surrounding areas can enter the fuel tank on the equipment. Particulate contamination of the fuel is not uncommon, and can occur both in the fuel tank that is on the equipment and in the fuel storage container. Contaminants in the fuel storage container can be transferred to the fuel tank on the equipment during a refueling operation. It is desirable to provide fuel as free from particle contamination as possible, to minimize the potential for damage to the engine, and to enable the engine to run as efficiently and trouble-free as possible.

An additional source of fuel contamination results from characteristics of present day fuels. Gasoline suppliers have increased the alcohol content in gasoline, which can present a problem during long term storage of the fuel either in a fuel storage container or in the fuel tanks on the equipment. The use of alcohol in fuels allows the phase separation of alcohol and water during temperature cycles. Since alcohol has the ability to absorb and retain water, the amount of which varies with ambient temperature, significant water volume can develop in fuels stored for extended periods of time. The alcohol in the fuel will absorb and retain water, then release the water during cold to hot to cold ambient temperature cycles. As a result, water can accumulate and remain in its natural state, subsequently fouling the fuel and possibly harming the combustion engine during use. Since the equipment itself may have infrequent use such that fuel remains in the fuel tank on the equipment for extended periods of time, fouling from the absorption and release of water can occur not only in fuel storage containers but in the fuel tank on the equipment itself. Water that has accumulated in the fuel storage container can be transferred to the fuel tank on the equipment during a refueling operation.

It is therefore advantageous and desirable to separate not only solid contaminants from fuels but accumulated water as well; and to do so as the fuel is delivered to an engine for combustion. While the problems described herein are of particular significance for the small gasoline engines described, the need for a filter as disclosed herein is not limited to such equipment. A larger gasoline engine can also benefit from use of the filter to be described. Further, other equipment circulating fluids that can be subjected to both particle contamination and fouling by water may benefit from use of the filter.

SUMMARY OF THE INVENTION

The water separation filter described herein provides an in-line, two-stage filter, with one stage of the filter removing particle contaminants and another stage of the filter separating water from the fuel. The filter captures both the particle contaminants and the removed water within the filter body for easy removal when the filter is replaced. The filter described herein can be used also on larger gasoline engines and equipment of other types for which filtration can be beneficial.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is an elevational view of a water separation filter;

FIG. 2 is a cross-sectional view of the water separation filter shown in FIG. 1, taken on line 2-2 of FIG. 1;

Figure 3:
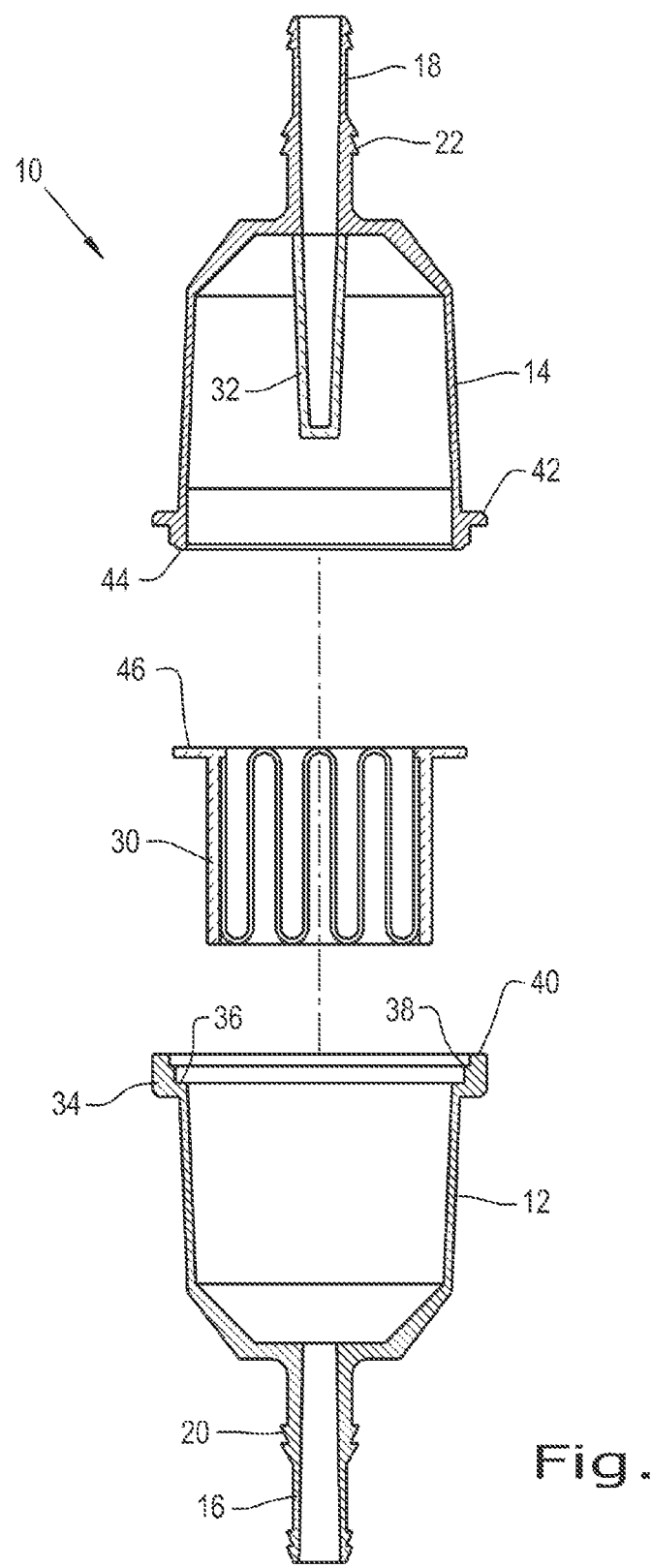
FIG. 3 is a cross-sectional, partly exploded view of the water separation filter.
Figure 4:
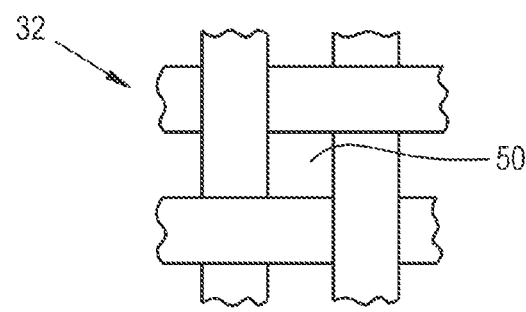
FIG. 4 is an enlarged illustration of a hydrophobic filter for a water separation filter.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now to the drawings more specifically, and to FIGS. 1-3 in particular, a water separation filter 10 is shown. Water separation filter 10 includes a first housing compartment 12 and a second housing compartment 14. An inlet fuel line coupling 16 is provided in flow communication with the interior of first housing compartment 12 and defines an inlet to first housing compartment 12, and an outlet fuel line coupling 18 is provided in flow communication with the interior of second housing compartment 14 and defines an outlet from second housing compartment 14. Accordingly, water separation filter 10 can be installed as an in-line filter in a fuel line of an internal combustion engine such that fuel from the equipment fuel tank enters water separation filter 10 at inlet coupling 16 in a contaminated state, the contaminants therein are removed and retained in housing compartments 12 and 14, and cleaned fuel passes from water separation filter 10 via outlet coupling 18. Inlet fuel coupling 16 and outlet fuel coupling 18 are hollow, tube-like structures, and can be provided with externally projecting ribs 20, 22, respectively, for engaging more securely end portions of fuel lines (not shown) which convey fuel to and from water separation filter 10.

First housing compartment 12 retains a particulate filter 30 for the removal of particulate contaminants, and second housing compartment 14 retains a hydrophobic filter 32 for the separation of water from fuel. First and second housing compartments 12 and 14 can be made of injection molded plastics that are suitable for use with fuels. Particulate filter 30 and hydrophobic filter 32 are placed in housing compartments 12 and 14 respectively, and the housing compartments 12, 14 are connected together by, for example, sonic welding to provide a leak-proof seal between housing compartments 12 and 14.

First housing compartment 12 and second housing compartment 14 are provided with complementary end shapes to facilitate assembly and securement of the housing compartments one to the other. In the exemplary embodiment shown, first housing compartment 12 is provided with an annular receiving structure 34 including inner surfaces forming steps 36, 38 and an outer end surface 40. Second housing apartment 14 is provided with an external ring 42 for engaging with and bonding to outer end surface 40. Second housing compartment 14 is further provided with an axial extension 44 sized and shaped to be received within receiving structure 34.

Particulate filter 30 can be of various known types and styles for removing particle contaminants. In the exemplary embodiment, a pleated filter of paper or synthetic material is used. Particulate filters of mesh style made of plastic or metals also can be used. Particulate filter 30 can be an insert molded filter, as known to those skilled in the art and can be a baked, cross-linked polymer filter. Cross-linking can be used to increase the strength of the particulate filter so that particulate filter 30 will resist damage from the fluid flow therethrough. Cross-linking can improve the life of the filter. As shown in the exemplary embodiment, a convoluted structure of particulate filter 30 can be used to trap particle contaminants in a relatively evenly distributed manner, due to turbulent flow of the fuel along and through the filter. The pleated filter provides a large surface area for filtration. Further, a particulate filter of an angular, oblong orientation, such as that disclosed in the aforementioned PCT patent application also can be used. Fuel and water can pass through particulate filter 30, while particle contaminants remain on the upstream side of particulate filter 30. Particulate filter 30 can be secured in first housing compartment 12 in various ways. In the exemplary embodiment shown, particulate filter 30 includes an external ring 46 that is captured between receiving structure 34 and axial extension 44.

Hydrophobic filter 32 is structured such that gasoline flows through the filter but water cannot pass therethrough. Such hydrophobic filter materials are known, and filter 32 can be provided by insert molding as known to those skilled in the art. The hydrophobic filter 32 has mesh openings or pores 50 of a size that together with polymeric properties of the material from which it is made repels water in a water and fuel mixture while allowing the fuel component of the mixture to pass therethrough. A fuel and water mixture passing through particulate filter 30 is substantially solid contaminant free, the solid contaminants having been removed by particulate filter 30. The mixture of fuel and water enters the area between particulate filter 30 and hydrophobic filter 32. Since the fuel can pass through the hydrophobic filter while the water cannot, the water is separated from the fuel and remains on the inlet side of hydrophobic filter 32. As a result, clean fuel having had both particulates and water removed therefrom is provided on the outlet side of hydrophobic filter 32 and flows through outlet 18 for combustion in the engine. In the exemplary embodiment shown in FIGS. 1-3, hydrophobic filter 32 is provided in the shape of a cone extending from the outlet of second housing compartment 14 substantially the length of second housing compartment 14. The conical hydrophobic filter 32 provides adequate screen area while leaving a large reservoir on the inlet side thereof for the retention of water separated from fuel by hydrophobic filter 32. Hydrophobic filter 32 is provided with a mesh or pore size or open area suitable to pass fuel therethrough while not allowing water to pass therethrough. The total open area is determined not only by the overall size of filter 10 and housing compartments 14, but also by the physical shape and orientation of, and therefore the size of hydrophobic filter 32.

Figure 5:
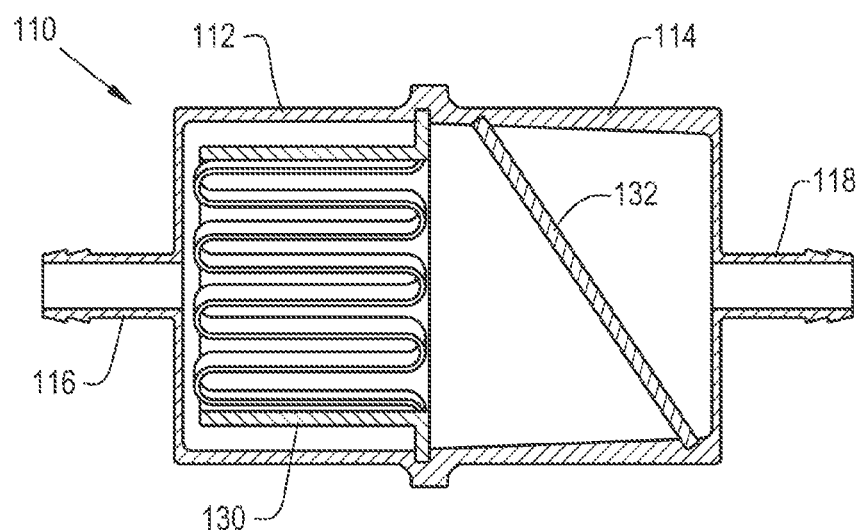
FIG. 5 is a cross-sectional view of another embodiment of a water separation filter.

Hydrophobic filters also can be provided in different shapes. For example, other shapes such as a cylinder and partial sphere can be used to generally enclose a volume at the outlet of the housing. The hydrophobic filter can be provided as barrier, such as a substantially flat body, disposed across the housing. FIG. 5 illustrates a water separation filter 110 having many structures similar to those described above with respect to water separation filter 10. As shown in FIG. 5, water separation filter 110 includes a first housing compartment 112 having an inlet fuel line coupling 116 and a particulate filter 130 as described previously herein with respect to first housing compartment 12, inlet fuel line coupling 16 and particulate filter 30. A second housing compartment 114 includes an outlet fuel line coupling 118 and a flat hydrophobic filter 132. Hydrophobic filter 132 is angular disposed in second housing compartment 114 relative to an axis of water separation filter 110, and maybe be of material similar to that described with respect to hydrophobic filter 32.

The structures of filters 10 and 110, including the placements of particulate filters 30, 130 and hydrophobic filters 32, 132 in compartments 12, 112, 14 and 114, and the attachment of the housing compartments one to another can be provided in many ways using insert molding, overmolding and other techniques well-known to those skilled in the art, along with sonic welding of component parts and other fastening techniques. Hydrophobic filters 32, 132 can be over molded onto a previously formed portions of housing compartments 14, 114 with an additional portion of compartments 14, 114 including outlet couplings 18, 118 over molded thereon or otherwise attached thereto by fastening techniques such as sonic welding. Individual previously formed halves of filters 10, 110, such as completed structures of first housing compartments 12, 112 with inlet couplings 16, 116 and particulate filters 30, 130; and second housing compartments 14, 114 with outlet coupling 18, 118 and hydrophobic filters 32, 132 can be attached one to another by sonic welding or other techniques. Conical hydrophobic filters 32 over molded to complete housing compartments 14 can eliminate individual compartment components and minimize manufacturing steps and costs.

The present water separation filter provides a compact filtering device for removing both particle contaminants and water contaminant in fuel, which is particularly advantageous on equipment used infrequently and/or for short time periods using consumer stored fuels, such as with small gasoline engines used in lawn and garden equipment, recreational equipment and the like. The filter is provided as a self-contained structure having conventional inlet and outlet connections so that the filter can be replaced periodically as a single unit by removing fuel line connections leading from the fuel tank to the inlet of the filter, and to the internal combustion engine from the filter. Standard ring clamp type connections can be used for easy removal of a used filter and attachment of a new filter within the fuel line circuit.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An in-line water separation filter for separating water from a mixture of water and a fuel for an internal combustion engine, said in-line water separation filter comprising:
    a housing comprising a first housing compartment and a second housing compartment;
    the housing having an inlet fuel line coupling defining an inlet to said first housing compartment and an outlet fuel line coupling defining an outlet from said second housing compartment;
    a particulate filter placed in the first housing compartment;
    a hydrophobic filter placed in the second housing compartment, said hydrophobic filter extending from the outlet of the second housing compartment and spaced away in a longitudinal direction from the particulate filter, said hydrophobic filter having a filter pore size sufficient for passing fuel for an internal combustion engine therethrough and insufficient for passing water therethrough.

2. The in-line water separation filter of claim 1, said hydrophobic filter enclosing a volume adjacent said outlet.

3. The in-line water separation filter of claim 1, said hydrophobic filter being shaped as a cone, wherein the inlet fuel line is located on a first side of the first housing compartment and the outlet fuel line is located on a second side of the second housing compartment, wherein the second side is opposite the first side.

4. The in-line water separation filter of claim 1, wherein a cross-section of the housing taken through the hydrophobic filter and lying on a plane that is parallel and on a longitudinal axis of the filter has only two walls extending in the longitudinal direction.

5. The in-line water separation filter of claim 1, wherein the hydrophobic filter is substantially coaxial with the inlet fuel line coupling and the outlet fuel line coupling.

6. The in-line water separation filter of claim 1, said hydrophobic filter not being a barrier across said housing.

7. The in-line water separation filter of claim 1, wherein: the inlet fuel line coupling defining an inlet includes a conduit having a total length that extends from a distal end of the inlet fuel line to an opening into a volume established by the housing, an end of the conduit opposite the distal end corresponding to the opening into the volume established by the housing is flush with surrounding walls of the first housing compartment immediately adjacent the conduit, the surrounding walls of the first housing compartment forming a portion of a boundary of the volume.

8. The in-line water separation filter of claim 7, wherein the in-line water separation filter consists of the particulate filter, the hydrophobic filter, the first housing compartment, and the second housing compartment.

9. The in-line water separation filter of claim 1, wherein the in-line water separation filter is configured to enable a water and fuel mixture unfiltered by the hydrophobic filter to travel from a first longitudinal end of an interior volume of the housing at an inlet into the housing to a second longitudinal end of an interior volume of the housing opposite the first longitudinal end, the second longitudinal end proximate an outlet of the housing.

10. The in-line water separation filter of claim 1, wherein: the in-line water separation filter is configured such that fuel filtered by the water separation filter is in fluid communication with at least a majority of the inner surface area of the housing.

11. The apparatus of claim 1, said hydrophobic filter being a total barrier across an interior of said housing such that, with respect to a longitudinal axis of the in-line water separation filter, fuel cannot reach a second side of the housing from a first side of the housing without passing through the hydrophobic filter, the second side of the housing being closer to the outlet fuel line than the inlet fuel line, and the first side of the housing being closer to the inlet fuel line than the outlet fuel line.

12. The apparatus of claim 1, wherein the first housing compartment and second housing compartment are both made of plastic, wherein the first housing compartment and the second housing compartment are provided with complementary end shapes to facilitate assembly and securement of the first and second housing compartments one to the other.

* * * * *